Patented Feb. 4, 1930

1,745,725

UNITED STATES PATENT OFFICE

WALTER O. SNELLING, OF ALLENTOWN, PENNSYLVANIA

METHOD OF PROTECTING TREES

No Drawing.   Application filed September 30, 1925.   Serial No. 59,727.

My invention relates to improvements in methods of protecting trees from insect pests, and more particularly relates to improvements in tacky or sticky compositions useful for forming a barrier around the trunks or branches of trees or around the stalks of other vegetable growths, for the purpose of preventing caterpillars or other crawling forms of animal life from passing from the ground to the upper branches of the tree, or the upper leaves of the plant.

For a number of years past ordinary sticky fly paper has been used to form a band or ring around the trunk of trees, in combating the spread of the gypsy moth and other destructive insect pests, and ordinary grease and coal tar are other agents which have been much used for a similar purpose. My invention relates to improved compositions offering many advantages of cheapness and efficacy over the compositions previously used as tree protecting agents.

A careful study of the compositions which have been used up to the present times as tree protecting agents have shown that these compositions are in general effective for only a relatively short time, exposure to the weather and to diurnal and seasonal changes of temperature rapidly leading to a marked loss in the efficiency of all such compounds, and one purpose of my present invention is to produce a composition for protecting trees which will be more efficient than the compositions which have been hitherto used, while a further object of my invention is to produce a composition which will retain its insect-entangling and insect-barring properties for a longer period of time than the tree protecting compositions which have been developed up to this time.

Ordinary coal tar and reduced coal tar have been found to be quite effective agents for protecting trees for a short period after they have been applied to the tree, and are believed by many persons to be the most effective agents which have been produced up to this time, although their effective life is extremely short. The study of a large number of trees on which coal tar rings have been applied as a means of protection have shown that in practically all cases the failure of the coal tar product to give long protection has been due to the fluidity of the material on warm days, the effect of temperature being to greatly decrease the viscosity, or to increase the fluidity, of the tar. As a result of this increased fluidity on warm days, and particularly under the influence of the direct rays of the sun, the ring of tar becomes imperfect, the tar flows down the trunk of the tree, and ridges of bark begin to show through the broken tar ring thus left. Caterpillars and other crawling forms of animal life find the ridges of bark thus exposed, and use them as "bridges" to pass over the tar barrier, and as soon as the first ridge of exposed bark becomes thus available for the passage of the caterpillars or other destructive insects, the efficiency of the tar barrier is destroyed.

Ordinary grease is extremely susceptible to changes in temperature, and in its ordinary application for lubricating purposes the efficiency of grease is in part dependent upon its changing under the influence of a very moderate increase in temperature from pasty form to liquid condition, and accordingly it is not surprising that grease has very short effective life as a tree protecting agent, and particularly during the warm days of summer when the need for protection is greatest.

The composition used on sticky fly paper is in general a mixture of a non-drying vegetable oil such as castor oil and a resin such as ordinary rosin. This mixture is also subject to great changes in viscosity with rather moderate changes in temperature, and unless used in the form of very thin films, flows readily on a warm day. As very thin films are ineffective in barring caterpillars, and rapidly lose their initial efficiency from the absorption of dust on warm, dry days, and as thick films rapidly become displaced through flowage from the effect of temperature, it will readily be seen that such mixtures are relatively ineffective.

As the systematic study of all tree protecting agents proposed and used up to this time indicated that the principal cause of the relatively short effective life of these compounds was to be found in changes of viscosity due to changes of temperature, particular attention was given to the study of the underlying factors involved in this behavior, and the characteristics of a large number of substances were studied over the temperature range that a tree protecting agent is required to successfully withstand. It is essential, for example, that a tree protecting agent should not become hard and brittle on cool mornings, as caterpillars could then pass the ring of protecting agent by crawling over its surface, temporarily hard from the effect of the low temperature. It is equally essential that a tree protecting agent should not become too fluid on warm afternoons, as the ring would then tend to "crawl" under the influence of gravity, and ridges of bark would soon become available for use as "bridges" for the caterpillars, over and past the protecting ring of the material.

From a careful and detailed study of the materials which are now used as tree protecting agents, it soon became apparent that all of these materials had too wide a range of viscosity with changes of temperature, and that a material showing little or no change in viscosity with change of temperature within the daily and seasonal range that trees are exposed to within the season when protection from caterpillars is most necessary, would be more satisfactory, if its other properties were equally good, than any of the materials now in use.

Further study showed that a reduction in the viscosity of a material with increased temperature, and an increase in the viscosity of a material with decreased temperature, is apparently a general law, and although many hundreds of samples of oils, tars, resins and greases were examined, no exception was found to this general tendency of the materials to show a great increase in fluidity on being warmed, and conversely a great increase in viscosity on being cooled.

Vulcanized rubber, however, showed relatively little change in its physical properties over a range of temperature which caused tar to change from a hard brittle solid at the lower end of the temperature range, to a thin mobile liquid at the upper end of the temperature range, and although vulcanized rubber is entirely unsuitable for use as a tree protecting agent, because of its relative firmness and lack of "stickiness", its ability to maintain its physical characteristics over a wide temperature range gave reason to hope that a material that would have the necessary "stickness" and that would still retain the ability to withstand temperature changes without notable changes in viscosity, might be made from vulcanized rubber by suitable chemical modification of the material.

Further study indicated that the product resulting from the careful heating of vulcanized rubber to a temperature slightly above its decomposition temperature, retained the characteristic property of rubber of being able to withstand temperature changes without notable change in physical properties, while the heating of the rubber to the temperature of incipient thermolysis or decomposition led to its transformation to a very "tacky" mass having very desirable properties as an insect-entangling agent for the protection of trees.

Further study showed that in addition to vulcanized rubber, vulcanized oils show similar characteristics, and by heating the commercial rubber substitute or rubber filler which is known as factis, factice or faktice, and which consists of the product of the vulcanization of a vegetable or animal oil with sulfur or sulfur chloride, to a temperature somewhat above its temperature of decomposition, a very sticky mass showing relatively little change in viscosity over a wide temperature range may be produced.

In the practical application of my invention I find it desirable to add oils such as corn oil, resins such as ordinary rosin, and fillers, such as wood pulp, to my thermolyzed vulcanized product, as the use of a high percentage of thermolyzed rubber or thermolyzed factis would give too expensive a product for general use. By employing reclaimed rubber and old or used rubber, the cost of the rubber may be considerably reduced, but as factis is cheaper than rubber, and in general gives products of very similar properties, I find the use of factis preferable to the use of rubber when products of low cost are to be made.

As an example of my invention, I will describe one method which I may employ in the preparation of a cheap and very efficient tree protecting agent from commercial brown factis. I first crush or "mill" the factis, and then admix 85 parts of the milled factis, 10 parts of ordinary rosin, and 5 parts of corn oil, and I heat this mixture until the factis decomposes and melts, and I then stir until a homogeneous mixture is obtained. Heating to too high a temperature or for too long a time should be avoided, but with most grades of commercial brown factis a temperature of about 150° C. and a heating period of from three to five minutes gives a satisfactory product.

It is the presence of sulfurized products of unknown but probably quite complicated composition that give to my mixtures or compositions their ability to withstand a considerable range of temperature change without becoming too hard on the one hand, or too soft on the other, and the products of the thermolysis of vulcanized oils show in general the same characteristics along this line that are exhibited by the products of thermolysis of vulcanized rubber, but I have found that sulfurized oil products have a decided advantage over vulcanized rubber through the fact that very tacky products may be made directly from vegetable or animal oils and sulfur chloride or sulfur, without the intermediate step of first forming a hard or "dry" factis product, and then thermolyzing this product to obtain a product having the necessary adhesiveness or stickiness. For example, 75 parts of cottonseed oil and 25 parts of sulfur chloride gives a hard and relatively dry factis, which can only be reduced to suitable condition for the preparation of a tree protecting agent by being heated to its point of decomposition, either alone or with from 5% to 50% of an oil or a resin, or preferably a mixture of both, but by using 87 parts of cottonseed oil and 13 parts of sulfur chloride, it is possible to obtain directly a tacky product, and in general by admixing any vegetable or animal oil, such as corn oil, rapeseed oil, lard oil or fish oil with a quantity of sulfur chloride just insufficient to completely vulcanize it, products of a very tacky or sticky nature may be obtained directly which have very desirable consistency for use in the preparation of tree protecting agents, either alone or after being heated with rosin or other materials which reduce the cost of the mixture without materially reducing its efficiency as a tree protecting agent.

When vulcanized products containing rosin are to be made, I find it desirable to dissolve the rosin or other resin in the oil, before adding the sulfur chloride or before heating with sulfur, as a product of somewhat greater "tackiness" is thus obtained than when the resin is heated with the factis as a separate operation. By the use of suitable amounts of oil, vulcanizing agent and resin the viscosity and "stickiness" of the resulting product may be modified over a wide range, the exact proportions of oil, vulcanizing agent and resin being of course determined by the characteristics of the particular oil used. Using cottonseed oil as my vulcanizable oil, sulfur chloride as my vulcanizing agent, and ordinary rosin as my resinous material, I prefer to use from 60 to 80 parts by weight of oil, from 5 to 15 parts by weight of sulfur chloride, and from 5 to 35 parts by weight of rosin, according to the degree of fluidity desired in the final product.

As a variant to the heating of solid factis to its thermolyzing temperature in order to impart to it a desirable degree of tackiness or stickiness, I have discovered that heating solid factis with a liquid solvent such as phenol will give a somewhat equivalent result, and as still another variant of my process I may bring together a vulcanizable oil, a vulcanizing agent, and a body having solvent action upon the factis formed by the action of the vulcanizable oil and vulcanizing agent. By mixing together 100 parts of cotton seed oil, 100 parts of phenol, and 100 parts of sulfur chloride, the latter being added very slowly and with continuous stirring, a sulfurized product is formed which contains as one of its components the resinous product produced by the union of phenol and sulfur chloride, and as another of its components the factis produced by the union of sulfur chloride and cottonseed oil, and accordingly the described process represents means by which a vulcanized oil and a resinous solvent for such vulcanized oil may be simultaneously made.

In general, I find corn oil, cottonseed oil, soya bean oil and rapeseed oil to be the most satisfactory vulcanizable oils for the practice of my present invention, although many other vegetable oils and animal oils may be used as equivalents of the oils named. As vulcanizing agents I prefer to use sulfur chloride or sulfur, in accordance with the usual practice in the manufacture of ordinary factis for use as a rubber substitute or rubber filler. As agents for imparting additional tackiness and stickiness to my compositions, and particularly as diluents for the purpose of reducing the cost of the finished products without materially reducing their efficiency as tree protecting agents, I may use rosin, coal tar, mineral oils, parafin, petrolatum, mineral rubber, and like materials, and particularly the products that are used in the rubber industry as fillers and rubber substitutes in the manufacture of the cheaper grades of soft rubber goods.

The essential feature of my present invention is the use of a sulfurized or vulcanized product as a constituent of tacky tree protecting agents, for the purpose of obtaining products which change relatively little in viscosity or fluidity, over the relatively wide temperature range between the colder hours in the early morning in spring time, and the very hot hours around noon and in the early afternoon, during the summer season. Tree protecting agents containing a tacky sulfurized or vulcanized product as herein described are superior to other tree protecting agents both in efficiency and in long life under unfavorable climatic conditions, and neither become hard and "dry" at low temperatures, nor excessively fluid and free-flowing at high temperatures.

As a wide variety of equivalents may be used without departing from the essential features of the method of protecting trees as herein described, no limitations are to be imposed upon my invention except as indicated in the appended claims.

I claim:

1. The method of protecting trees which comprises forming a ring of a tacky non-drying vulcanized oil product around the trunk of such tree.

2. The method of protecting trees which comprises forming a ring of a tacky non-drying mixture comprising a vulcanized oil around the trunk of such trees.

3. A non-drying tree protecting agent comprising a partially vulcanized oil product.

4. A tree protecting agent comprising a non-drying partially but incompletely vulcanized oil.

5. A tree protecting agent comprising a non-drying partially but incompletely vulcanized oil and a resin.

6. The method of protecting vegetable growths from insect pests which comprises girdling the trunk or stem of such vegetable growth with a non-drying composition comprising a sulfurized oil product.

In testimony whereof, I have hereunto subscribed my name this 29th day of September 1925.

WALTER O. SNELLING.